US007822291B2

(12) United States Patent
Guetter et al.

(10) Patent No.: US 7,822,291 B2
(45) Date of Patent: Oct. 26, 2010

(54) NON-RIGID MULTI-MODAL REGISTRATION USING STATISTICAL LEARNING METHODS

(75) Inventors: Christoph Guetter, Princeton, NJ (US); Chenyang Xu, Allentown, NJ (US); Joachim Hornegger, Effeltrich (DE); Frank Sauer, Princeton, NJ (US)

(73) Assignees: Siemens Medical Solutions USA, Inc., Malvern, PA (US); Friedrich-Alexander-Universitat Erlangen-Nurnberg, Erlangen (DE)

(*) Notice: Subject to any disclaimer, the term of this patent is extended or adjusted under 35 U.S.C. 154(b) by 959 days.

(21) Appl. No.: 11/259,560

(22) Filed: Oct. 26, 2005

(65) Prior Publication Data

US 2006/0093209 A1     May 4, 2006

Related U.S. Application Data

(60) Provisional application No. 60/622,971, filed on Oct. 28, 2004.

(51) Int. Cl.
  G06K 9/32  (2006.01)
(52) U.S. Cl. .................. 382/294; 382/128; 382/155; 382/159; 382/160
(58) Field of Classification Search .......... 382/155–162
  See application file for complete search history.

(56) References Cited

U.S. PATENT DOCUMENTS 5,974,165 A * 10/1999 Giger et al. ................ 382/132
6,266,453 B1 * 7/2001 Hibbard et al. ............. 382/294
7,263,243 B2 * 8/2007 Chen et al. ................. 382/294
7,280,710 B1 * 10/2007 Castro-Pareja et al. ...... 382/303
7,450,780 B2 * 11/2008 Roche et al. ................ 382/276
2002/0173723 A1 * 11/2002 Lewis et al. ................ 600/473
2006/0029291 A1 * 2/2006 Sun et al. ................... 382/294

OTHER PUBLICATIONS

Michael E. Leventon, et al., "Mulit-Modal Volume Registration using Joint Intensity Distributions," Artificial Intelligence Laboratory, vol. 1496, 1998, pp. 1057-1066.*
Christophe Chef'd Hotel, et al., "A Variational Approach to Multi-Modal Image Matching," IEEE Workshop on Variational and Level Set Methods in Computer Vision, 2001, pp. 21-28.*
Albert C.S. Chung, et al. "Multi-Modal Image Registration by Minimising Kullback-Leibler Distance," Medical Image Computing and Computer-Assisted Intervention—MICCAI 2002, pp. 525-532.*
Gerardo Hermosillo, Christophe Chefd'Hotel and Olivier Faugeras, "Variational Methods for Multimodal Image Matching" International Journal of Computer Vision, vol. 50, No. 3, Dec. 2002, pp. 329-343.*

(Continued)

Primary Examiner—Matthew C Bella
Assistant Examiner—Eric Rush
(74) Attorney, Agent, or Firm—Donald B. Paschburg; F. Chau & Associates, LLC (57) ABSTRACT

A computer-implemented method for non-rigid multi-modal registration, includes providing trained data corresponding to previously registered images captured by different modalities, receiving two or more images captured by the different modalities, and registering the two or more images according to context information determined based on the trained data.

11 Claims, 4 Drawing Sheets

OTHER PUBLICATIONS

Nicolae Duta and Milan Sonka, "Segmentation and Interpretation of MR Brain Images: An Improved Active Shape Model", IEEE Transactions on Medical Imaging, vol. 17, No. 6, Dec. 1998, pp. 1049-1062.*

D. Rueckert, M. J. Clarkson, D. L. G. Hill and D. J. Hawkes, "Non-Rigid Registration using Higher-Order Mutual Information" Proceedings of the SPIE Conference on Medical Imaging, vol. 3979, 2000, pp. 438-447.*

William M. Wells, III, et al. "Multi-Modal Volume Registration by Maximization of Mutual Information."

Michael E. Leventon, et al., "Multi-Modal Volume Registration Using Joint Intensity Distributions," *Artificial Intelligence Labroratory*, pp. 1-10.

Josien P. W. Pluim, et al., "Mutual Information Base Dregistration of Medical Images: A Survey." *IEEE Transactions on Medical Imaging*, Vo., XX, No. Y. Month 2003, pp. 1-21.

Peter Lorenzen, et al., "Mutli-Class Posterior Atlas Formation Via Unbiased Kullback-Leibler Template Estimation," *MICCAI 2004, LNCS 3216*, pp. 95-102, 2004.

Albert C.S. Chung, et al. "Multi-Modal Image Registration by Minimising Kullback-Leibler Distance," *MICCAI 2002, LNCS 2489*, pp. 525-532, 2002.

William M. Wells, III, et al. "Multi-Modal Volume Registration by Maximation of Mutual Information."

Rui Gan, et al., "Multiresolution Image Registration Based on Kullbank-Leibler Distance," *MICCAI 2004, LNCS 3216*, pp. 599-606, 2004.

Lilla Zöllei, et al., "A Unified Statistical and Information Theoretic Framework for Multi-Modal Image Registration."

Gerardo Hermosillo Valadez, "Variational Methods of Multimodal Image Matching," pp. 1-198; 2002.

Chefd'Hotel, Christophe; Hermosillo, Gerardo; Faugeras, Oliver: A Variational Approach to Multi-Modal image Matching, IEEE Workshop on Variational and Level Set Methods in Computer Vision, 2001, ISBN: 0-7695-1278-X, S. 21-28, DOI: 10.1109/VLSM.2001.938877.

Wyatt, Paul P.; Noble, J. Alison: MAP MRF joint segmentation and registration of medical images, Medical Image Analysis 7 (2003) 539-552, ScienceDirect [online]. DOI: 10.1016/S1361-8415(03)00067-7.

* cited by examiner

NON-RIGID MULTI-MODAL REGISTRATION USING STATISTICAL LEARNING METHODS

This application claims priority to U.S. Provisional Application Ser. No. 60/622,971, filed on Oct. 28, 2004, which is herein incorporated by reference in its entirety.

BACKGROUND OF THE INVENTION

1. Technical Field

The present invention relates to multi-modal image registration, and more particularly to a system and method for non-rigidly registering multi-modal image data using statistical learning methods.

2. Discussion of Related Art

Non-rigid multi-modal image/volume registration is an open research problem and an important part of ongoing research. Non-rigid multi-modal image registration in medical applications has become significantly important to doctors. In such an environment, accuracy, robustness, and performance are needed to reliably support diagnoses. Current non-rigid multi-modal registration technology is increasingly sophisticated but context-free.

The fusion of complimentary image information has been shown to be particularly beneficial to diagnosis. Furthermore, imaging techniques such as molecular imaging need multi-modal image registration to display functional, anatomical and/or molecular image information in a single fused image.

An important challenge of non-rigid multi-modal registration is handling unresolved correspondences of image/volume locations that arise from attempts to associate functional areas with anatomy. It is an open problem to retrieve those correspondences reliably and in a way that is meaningful to the user, e.g., doctor. Existing non-rigid image registration methods address unresolved correspondences by stating an energy functional which global optimum presents a solution to the underlying registration problem. Such an energy functional may, for example, be composed of an attraction potential, e.g., similarity/distance measure, and a regularizing term that constrains the potential in a somewhat meaningful way. Regularization is needed due to the ill-posed nature of the registration problem. A proposed solution may be found by either walking along a gradient or solving a PDE associated with the problem. The ill posedness of the energy functional and/or the size of the parameter space are still problematic while retrieving a global optimum by using regularization. Regularization may lead to mis-registration or convergence to a local extremum.

Therefore, a need exists for a system and method for non-rigidly registering multi-modal image-data using statistical learning methods.

SUMMARY OF THE INVENTION

According to an embodiment of the present disclosure, a computer-implemented method for non-rigid multi-modal registration, includes providing trained data corresponding to previously registered images captured by different modalities, receiving two or more images captured by the different modalities, and registering the two or more images according to context information determined based on the trained data.

Registering the two or more images is automatic.

The trained data is a joint probability function of the different modalities. The joint probability function is a constraint or a regularizing factor in an optimization process of the registration. The trained data is an average image location of an image intensity pair. The trained data is shape information, the method includes determining one or more shapes in the two or more images, and classifying the one or more shapes as valid or invalid according to the trained data.

A correspondence between the two or more images is determined using a context information of shapes in the different modalities of the trained data.

According to an embodiment of the present disclosure, a computer-implemented method for non-rigid multi-modal registration includes providing trained data corresponding to a prior registration and providing two or more images captured using different modalities. The method includes determining a displacement field of the two or more images, wherein a first image of the two or more images is defined as a reference image and a subsequent image is defined as alignment image comprising, estimating a marginal distribution of the reference image and the alignment image, and estimating a joint intensity distribution between the reference image and the alignment image. The method includes aligning the two or more images by adjusting the joint intensity distribution until it substantially matches a learned joint intensity distribution of the trained data and simultaneously obtains a desirable a similarity measure between two or more images and the trained data.

The aligning of the two or more images comprises regularization of the displacement field between the two or more images and the trained data. The regularization uses a Tikhonov regularization with the following gradient:

$$\nabla_u R[u] = div\left(\frac{R'[u]}{|\nabla u|}\nabla u\right) = div(\nabla u) = \Delta u,$$

where u is the displacement field, and $\mathcal{R}$ defines regularization on u. The method for non-rigid multi-modal registration is given by:

$$\mathcal{J}(u) = \alpha \mathcal{I}_{MI}(u) + (1-\alpha)\mathcal{I}_{KL}(u) + \lambda \mathcal{R}(u), \alpha \in [0,1],$$
$$\lambda \in \mathbb{R}_+, \hat{u} = argmin \mathcal{J}(u),$$

where $\lambda$ is a positive constant that determines an amount of regularization, $\mathcal{I}$KL measures a divergence between the joint intensity distribution of the two or more images and the joint intensity distribution of the trained data, and $\mathcal{I}$MI denotes a mutual information of the joint intensity distribution of the two or more images.

The desirable a similarity measure between two or more images and the trained data is a maximum.

According to an embodiment of the present disclosure, a program storage device is provided, readable by machine, tangibly embodying a program of instructions executable by the machine to perform method steps for non-rigid multi-modal registration. The method includes providing trained data corresponding to previously registered images captured by different modalities, receiving two or more images captured by the different modalities, and registering the two or more images according to context information determined based on the trained data.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A method for non-rigid multi-modal image registration implements a-priori knowledge. A-priori knowledge is gained from registered images that are used to statistically learn probability distributions prior to a registration being performed on images of interest. Unregistered images are aligned by a non-rigid registration method making use of the trained knowledge.

Figure 1:
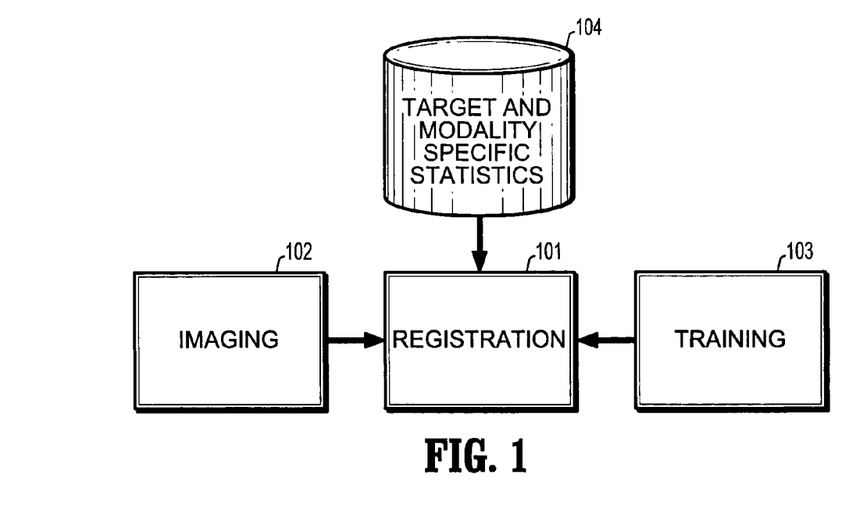
FIG. 1 is a diagram of a system for multi-modal image registration according to an embodiment of the present disclosure.
Figure 2:
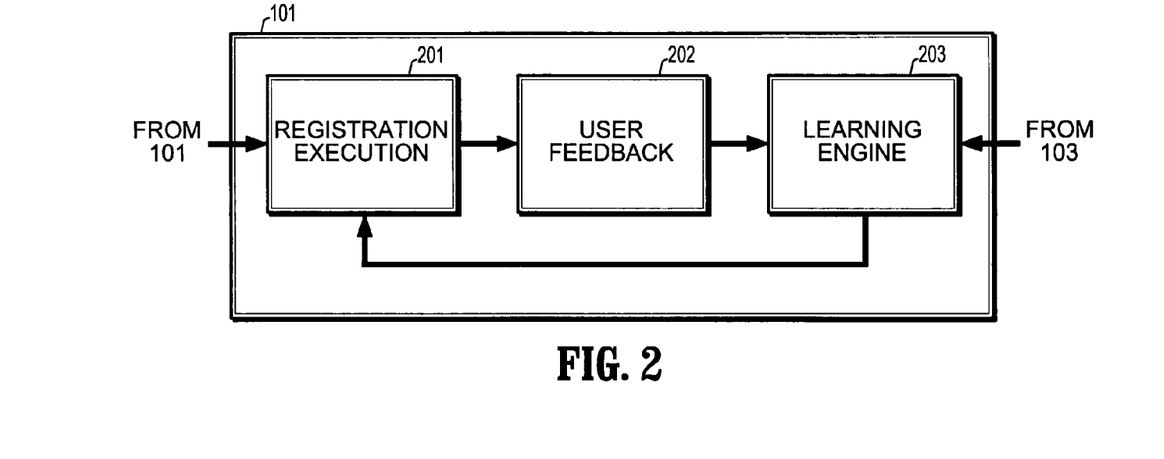
FIG. 2 is a diagram of the registration block 102 in FIG. 1.

Referring to FIG. 1, a system for multi-modal registration includes a registration component, an imaging component, a training component, and optionally, a database of target and modality specific statistics. The registration component 101 receives at least two unregistered images captured using different modalities, e.g., single photon emission CT (SPECT)/ Computed Tomography (CT), positron emission tomography (PET)/CT, or T1-T2 MR images. The unregistered images are supplied by an imaging component 102, for example, imaging hardware/software. The registration component 101 uses context information of shapes in the unregistered images for alignment of the unregistered images input by the imaging component 102. The context information is supplied by a training component 103. The training component 103 implements statistical learning methods to support registration, or an optimization process, of the registration component 101. Training data is input to the registration component 100 by a training component 103. The training data comprises a-priori data determined from previously registered images representing the modalities of the unregistered images; previously registered multi-modal datasets. An alignment of the pre-registered images may be determined for example by a technician. Referring to FIG. 2, the datasets, e.g., point correspondences, are used to learn context information 203. Once context information is learned the context information is available for registration 201.

Context knowledge guides automated registration. Context can be brought into the registration process 201 by several strategies. One strategy is to use statistical learning methods 203 where pre-registered datasets provide the context knowledge. The registration system learns statistical information from the automatically and/or manually pre-registered datasets and retrieves information, which can be considered ground truth that future registrations benefit from. This information is also known as a-priori knowledge because it is gained before registration.

A non-rigid registration method 201 performed by the registration component 101 follows a general framework of optimizing an energy function to find the underlying transformation between the images. Furthermore, the non-rigid registration method 201 incorporates a-priori knowledge 203 to guide the registration or an optimization process; A-priori knowledge can be either used to drive the registration process or as a regularizing constraint in the optimization process.

This knowledge can be of different kinds.

In addition to incorporating a-priori knowledge 203, information can also be gained from user feedback 202. Having a registration 201 that learns from a-priori knowledge 203 benefits the success rate of non-rigid multi-modal registration 201. In some cases the user may not be satisfied with the registration results 204 for a variety of reasons. The system learns from a-priori knowledge, thus, feedback knowledge 205 from the user may be incorporated. Thus, the registration process 201 not only benefits from a-priori knowledge 203 of trained datasets 104 but also from a feedback loop fed by information given through the user 202.

Feedback 202 may be manually determined by correcting a registration result 204, for example, at some chosen landmark positions. This correction information is then fed back 205 to the learning component 203 to improve future registration 201.

In multi-modal cases, registration performed at different organs of interest differs in the degree of challenge. This is due to the capabilities of the different imaging techniques, e.g., PET acquisitions of the head are clearer in terms of anatomy than those of the thorax for example. Therefore, organ specific learning methods may be supported by the registration component.

A manual or automatic database classification keeps track of the a-priori information per organ and modality combination that will then be used accordingly in the registration execution.

Those databases (see FIG. 1, block 104), which keep the information about the organ and modality specific statistical information, can be shared and/or extended by systems influenced/trained through different users. Assuming registration systems are installed at several hospitals, the differently learned a-priori information can be used for synergy. Thus, one system can constantly learn and improve based on the feedback of many users, e.g., specialists. The information may be shared over a network such as the Internet or a private network between the hospitals. Registration quality will greatly benefit by such a learning system.

Learning methods 103 are described as supervised learning methods. Other learning methods may be implemented. For example, in case of insufficient data availability, e.g., not enough pre-registered image data, an unsupervised learning technique could be used. Those techniques help dealing with the problem of not knowing what a ground truth looks like.

It is to be understood that the present invention may be implemented in various forms of hardware, software, firmware, special purpose processors, or a combination thereof. In one embodiment, a regularized Bayesian method for image restoration may be implemented in software as an application program tangibly embodied on a program storage device. The application program may be uploaded to, and executed by, a machine comprising any suitable architecture.

Figure 3:
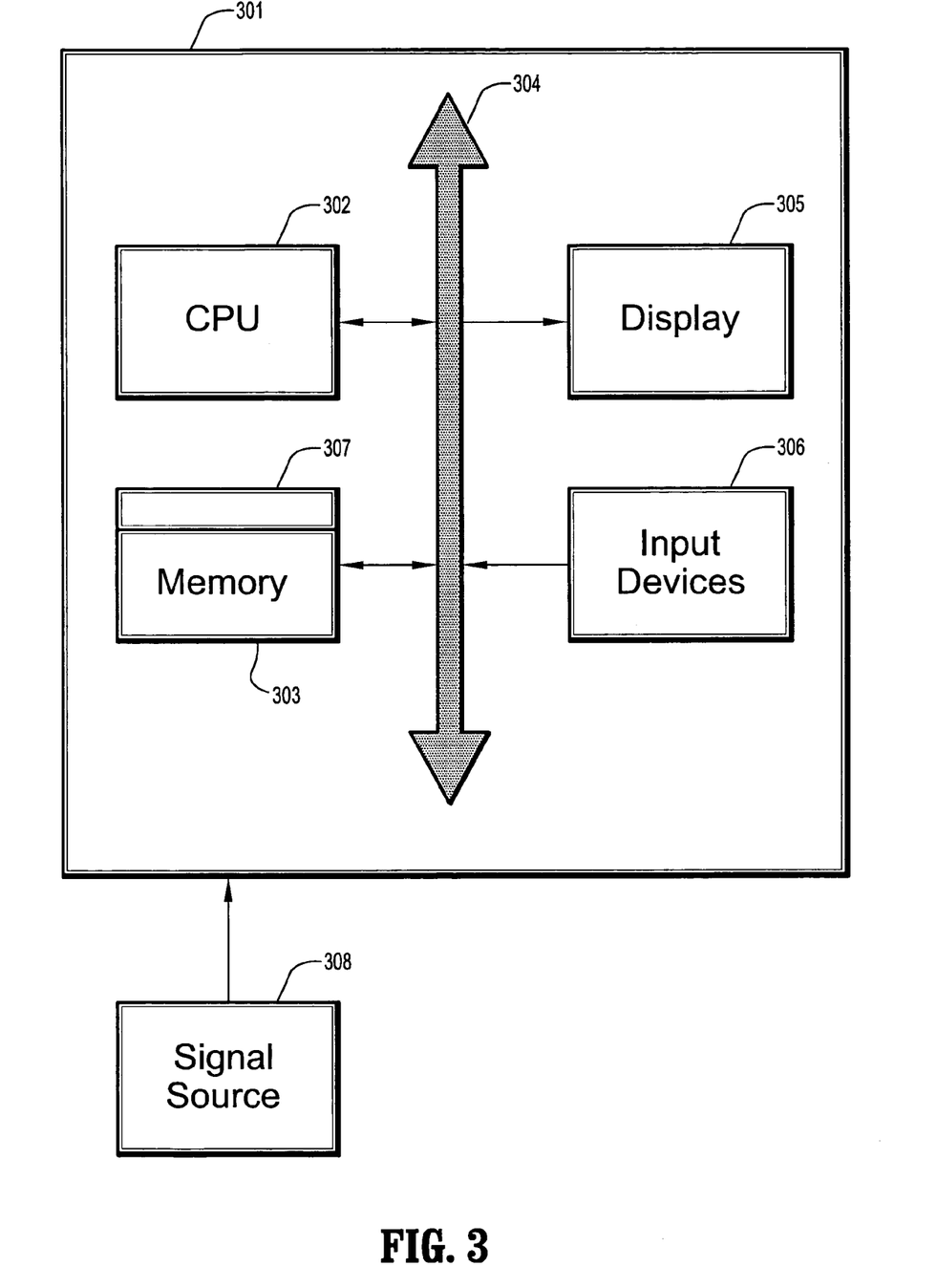
FIG. 3 is a diagram of a computer system for multi-modal image registration according to an embodiment of the present disclosure.

Referring to FIG. 3, according to an embodiment of the present disclosure, a computer system 301 for implementing a registration method for multi-modal images can comprise, inter alia, a central processing unit (CPU) 302, a memory 303 and an input/output (I/O) interface 104. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present invention.

The computer platform 301 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present disclosure.

Figure 7:
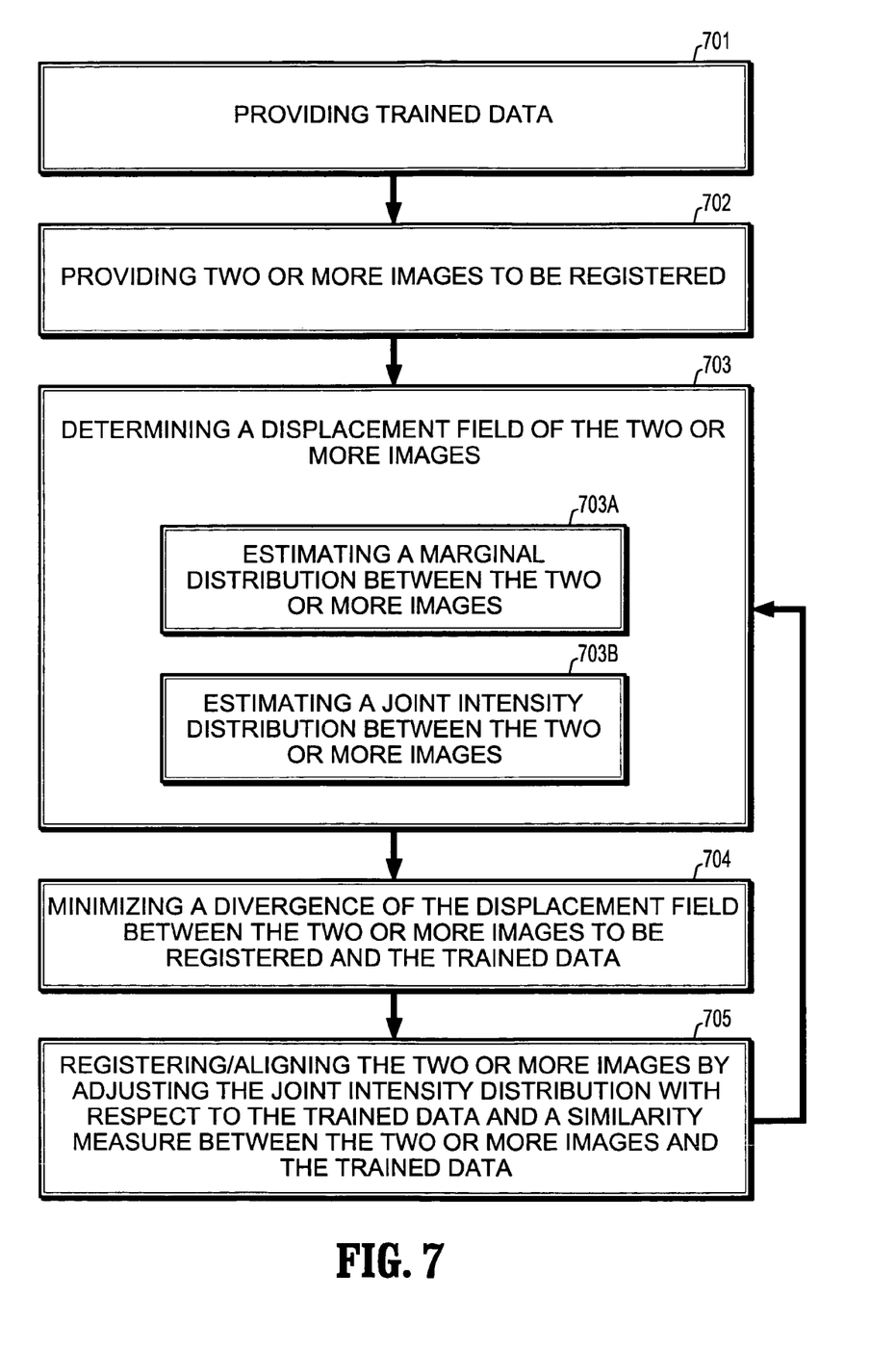
FIG. 7 is a flow chart of a method according to an embodiment of the present disclosure.

Referring to FIG. 7, a method according to an embodiment of the present disclosure combines both perspectives 702 into a unified formulation by simultaneously encouraging the observed joint intensity distribution to resemble the expected joint intensity distribution learned a-priori 701 and maximizing a similarity measure. This can be intuitively understood as guiding a context-free similarity measure by prior knowledge.

A combined registration framework according to an embodiment of the present disclosure can be defined as a minimization of the following cost function:

$$\mathcal{J}(u) = \alpha \mathcal{I}_{MI}(u) + (1-\alpha) \mathcal{I}_{KL}(u) + \lambda \mathcal{R}(u), \alpha \in [0,1],$$
$$\lambda \in \mathbb{R}_+ \hat{u} = \text{argmin} \mathcal{J}(u),$$

where u is a displacement field, $\mathcal{R}$ defines regularization or smoothing on u, and $\lambda$ is a positive constant that decides the amount of regularization. $\mathcal{I}$KL measures the KL divergence between observed and learned data, and $\mathcal{I}$MI denotes an expression for Mutual Information (MI) of the observed data. A displacement field that maximizes MI is being steered by prior information to achieve accurate alignment. The factor $\alpha$ controls the amount of guidance through prior knowledge. For $\alpha=0$ the registration problem is solely based on the prior information. For $\alpha=1$ the registration is defined as the classical optimization of MI without any prior information. For $\alpha \in (0,1)$, the maximization of MI is driven by clinical context in the form of prior knowledge captured by the minimization of the KL divergence. This prior knowledge can be acquired in several ways. One can use the expert knowledge of a physician who manually aligns training images or one can leverage the fused imaging data acquired using the dual-modality (PET/CT, SPECT/CT), also known as hybrid scanners. The latter provides extensive amounts of pre-registered data, which is very important for avoiding patient specific training data. To increase robustness, one may learn a joint density distribution that represents mean prior information of n pre-aligned images. But the mean prior information needs to be examined carefully as most scanners cannot correct the misalignment due to organ movement.

In the following two images that are to be registered by the functions are referred to as $f_1: \Omega \subset \mathbb{R}^n \mapsto \mathbb{R}$ and $f_2: \Omega \subset \mathbb{R}^n \mapsto \mathbb{R}$. The images are registered by retrieving an underlying displacement field 703. Given the images, the displacement field can be modeled by a mapping $u: \Omega \mapsto \Omega$. Without loss of generality, $f_1$ may be denoted as the reference image and $f_2$ as the alignment image during the registration process.

The marginal 703A and joint intensity distributions 703B estimated from $f_1(x)$ and $f_2(x+u(x))$ are indicated by $p_1^o(f_1)$, $p_2^o(f_2)$ and $p_u^o(f_1, f_2)$, respectively. $p^l(f_1, f_2)$ is an estimate for the joint intensity distribution of the training data. In practice, the distributions are estimated by using a non-parametric Parzen window estimator with a Gaussian as the windowing function.

Prior knowledge is incorporated by minimizing the KL divergence between observed and trained data 704. The KL divergence for a given displacement field u can be expressed as:

$$I_{KL}(u) = \int_\Omega p_u^o(i_1, i_2) \ln \frac{p_u^o(i_1, i_2)}{p^l(i_1, i_2)} dx \quad (2)$$

where $i_1 = f_1(x)$ and $i_2 = f_2(x+u(x))$. The MI-based objective function is defined as the negate MI between the reference image and the alignment image transformed by u and can be expressed as:

$$I_{MI}(u) = -\int_\Omega p_u^o(i_1, i_2) \ln \frac{p_u^o(i_1, i_2)}{p_1^o(i_1) p_2^o(i_2)} dx, \quad (3)$$

MI can be viewed as the KL divergence between the observed joint density and the product of the observed marginals, whereas in $\mathcal{I}$KL the product of the marginal densities is replaced by the prior knowledge learned from training data. Note that the negate MI is used here to define a cost.

The minimum of (1) can be found by means of variational calculus. One may descend the gradient of the combined functional with respect to the displacement field. The gradient of (1) is defined as, $$\nabla_u \mathcal{J} = \alpha \nabla_u \mathcal{I}_{MI} + (1-\alpha) \nabla_u \mathcal{I}_{KL} + \lambda \nabla_u \mathcal{R} \quad (4)$$

The gradient of MI has been derived by Hermosillo et al.; the gradient of MI has been derived with respect to individual voxel displacements using a continuous and differentiable joint probability distribution constructed by Parzen windowing, yielding a voxel-wise displacement field. The gradient of MI can be written as:

$$\nabla_u I_{MI} = -\frac{1}{N}\left[\left(\frac{\partial_2 p_u^o(i_1, i_2)}{p_u^o(i_1, i_2)} - \frac{\partial_2 p_u^o(i_2)}{p_u^o(i_2)}\right) * G_\sigma\right] \quad (5)$$

$$(f_1(x), f_2(x+u(x)) \cdot \nabla f_2(x+u(x)).$$

To derive the gradient of the KL divergence, the definition for a non-parametric Parzen density model may be used. After some manipulation, $\nabla_u \mathcal{I}$KL can be written as follows, $$\nabla_u I_{KL} = -\frac{1}{N}\left[\left(\frac{\partial_2 p_u^o(i_1, i_2)}{p_u^o(i_1, i_2)} - \frac{\partial_2 p^l(i_1, i_2)}{p^l(i_1, i_2)}\right) * G_\sigma\right] \quad (6)$$

$$(f_1(x), f_2(x+u(x)) \cdot \nabla f_2(x+u(x)).$$

Here, $G_\sigma$ is a two-dimensional Gaussian with standard deviation $\sigma$, $\partial_2$ is the partial derivative of a function with respect to its second variable, and N is a normalizing constant. The term $$\frac{\partial_2 p_u^o(i_1, i_2)}{p_u^o(i_1, i_2)} - \frac{\partial_2 p^l(i_1, i_2)}{p^l(i_1, i_2)}$$

is a comparison/similarity function of a registration method. This comparison function is evaluated repeatedly during the registration, in this case for a maximum. Alignment is achieved by repeated or continuous adjustments of the joint intensity model until it resembles the learned joint intensity distribution 705. Furthermore, by this assessment it can be seen that in a KL-based approach according to an embodiment of the present disclosure, the observed joint intensity distribution does not remain static.

Variational calculus allows for a minimizing displacement field to be determined by descending along the gradient $\nabla_u \mathcal{J}$. The gradient flow:

$$u_t = -\nabla_u \mathcal{J}$$

$$u(\cdot, 0) = u_0 \quad (7)$$

with $u_0$ being a suitable initial guess for the displacement field. A Tikhonov model may be used for regularization 705, e.g., $$R[u] = \frac{1}{2} \int_\Omega |\nabla u(x)|^2 \, dx.$$

Its gradient expression is:

$$\nabla_u R[u] = div\left(\frac{R'[u]}{|\nabla u|} \nabla u\right) = div(\nabla u) = \Delta u,$$

where $\Delta$ denotes the Laplace operator. Starting from an initial guess, a gradient descent strategy is followed to find a solution for (1). To recover a larger class of deformations, to decrease computational cost, and to avoid irrelevant extrema of the non-convex functional, a coarse to fine scheme may be used, e.g., consecutively smoothing and sub-sampling the images.

The trained data may be, for example, a joint probability function of different modalities. Another example of trained data is an average image location of an image intensity pair. Still another example, of trained data is shape information, wherein the shape information is compared to shape information determined to the images to be registered. The shape information may be used to determine whether a registration is valid according to the shapes, e.g., certain organs have certain expected shapes. Other examples of trained data would be obvious to one of ordinary skill in the art in view of the present disclosure.

Figure 4A:
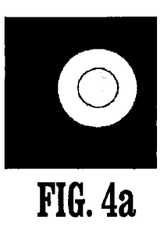
FIGS. 4a-g are diagrams of a phantom images according to an embodiment of the present disclosure.
Figure 4B:
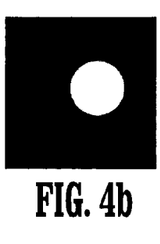
Figure 4C:
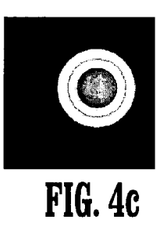
Figure 4D:
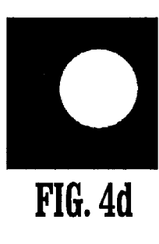
Figure 4E:
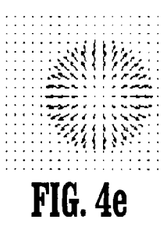
Figure 4F:
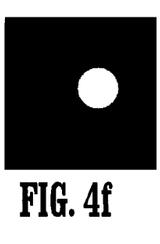
Figure 4G:
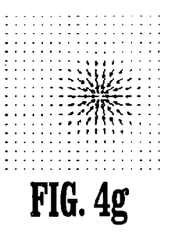

Phantom images were created to point out the importance of using context-specific information. FIGS. 4a-g visualize an ambiguous setting for non-rigid registration. FIG. 4a is a reference image (512×512), FIG. 4b is an alignment image, and FIG. 4c is a difference image. A circle is registered non-rigidly to another one that is of different intensity. However, its location is chosen such that there is an overlap with two other circles, a smaller and a larger circle, in a joint image (FIG. 4a). This setup suggests that there are at least two equivalent optima for a context-free distance measure to align the circles. Two methods were compared, e.g., minimizing (1) with $\alpha=1$ and $\alpha=0$ respectively. The registration was trained such that the circle should align to the small circle. The MI method, $\alpha=1$, finds an optimum in registering to the big circle, FIGS. 4(d) and 4(e). The KL approach, $\alpha=0$, registers to the small circle, FIGS. 4(f) and 4(g). Note that using the KL approach, the method can also be trained to align to the big circle.

Figure 5A:
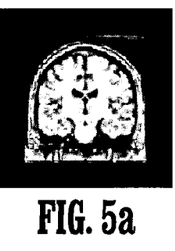
FIGS. 5a-f are slice images according to an embodiment of the present disclosure.
Figure 5B:
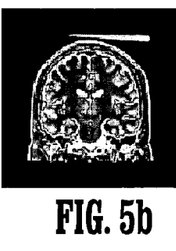
Figure 5C:
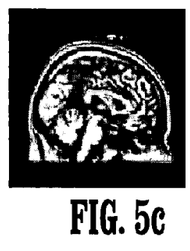
Figure 5D:
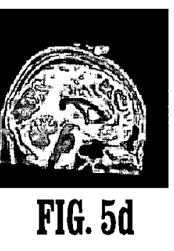
Figure 5E:
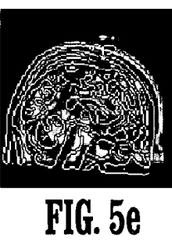
Figure 5F:
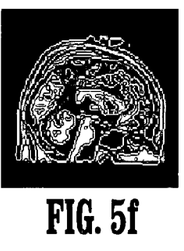

The KL method ($\alpha=0$) was tested on a simulated T1/T2 magnetic resonance imaging (MRI) brain data set acquired from the Brain Web Simulated Brain Database. T1 and T2 represent two different modalities of MRI scans, wherein T1 is spin-lattice relaxation time and T2 is a spin-spin relaxation time. The coronal slices, FIGS. 5a and 5b, were used for training whereas registration was performed on the sagittal slices, FIGS. 5c and 5d.

The T2 image has been deformed by an artificially created displacement field. This experiment shows the strength of training joint intensity distributions that are used successfully for non-rigid registration.

Figure 6A:
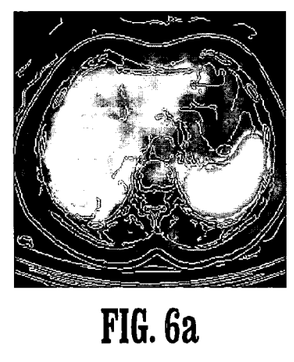
FIGS. 6a-d are SPECT/CT images according to an embodiment of the present disclosure.
Figure 6B:
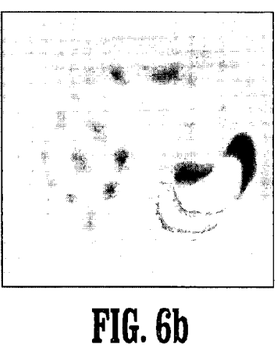
Figure 6C:
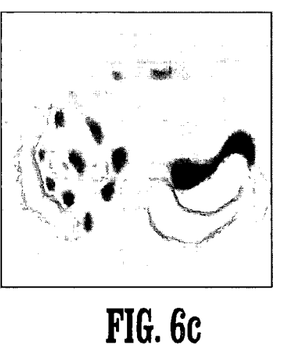
Figure 6D:
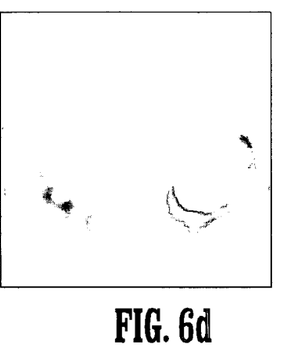

Another experiment was performed on two corresponding slices of a SPECT/CT data set (see FIG. 6a) acquired by a Siemens Symbia T2 SPECT/CT hybrid scanner. Prior knowledge was generated from those two slices and deformed the SPECT slice by an artificial displacement field (see FIG. 6b). MI ($\alpha=1$) and KL ($\alpha=0$) are compared for performance and the final registration results are visualized in FIGS. 6c and 6d, respectively. Since the ground truth is available, the difference between the warped SPECT images and the original image for visual evaluation can be determined. From the difference images, although a multi-resolution strategy was used, the MI-based approach gets trapped in an irrelevant local minimum possibly due to its insensitivity to local deformation. This experiment demonstrates the potential benefit of incorporating prior knowledge for registration in clinical applications.

Another experiment describes a PET/CT registration from clinical practice involving a visual evaluation by an expert. The imaging data acquired from a 70 year old male patient with multiple lesions in the lung and was acquired by a Siemens Sensation 10 (CT) and a Siemens Ecat 926 (PET). The PET was acquired 6 days after the CT. According to the evaluation of an expert physician, only parts of the volume were registered accurately by a preceding manual fusion. For experimentation, two slices were trained on that were classified as well registered and performed a method for registration on a misaligned slice. The physician evaluated the combined approach, e.g., 40% MI and 60% KL, as the most accurate one among three registration results (combined, pure MI and pure KL) due to its accuracy not only in the alignment of the heart but also in the matching of the thoracic, mediastinal and hepatical (liver) outlines. Variations in the percentages of the combined approach are possible.

According to an embodiment of the present disclosure, non-rigid multi-modal image registration uses prior information. The framework allows flexible adjustment for the available quality of prior knowledge. Preliminary experiments on synthetically created phantoms and on real MRI, SPECT/CT, and PET/CT data show that prior knowledge can be important for retrieving a desirable underlying displacement field.

Having described embodiments for a system and method for multi-modal image registration, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for non-rigid multi-modal registration, the method comprising:

providing trained data corresponding to a prior registration;

providing two or more images captured using different modalities;

performing a non-rigid multi-modal registration of the two or more images, the non-rigid multi-modal registration comprising:

determining a displacement field of the two or more images, wherein a first image of the two or more images is defined as a reference image and a subsequent image is defined as alignment image comprising, estimating a marginal distribution of the reference image and the alignment image, and estimating a joint intensity distribution between the reference image and the alignment image; and aligning the two or more images by adjusting the joint intensity distribution until an alignment of the two or more images corresponds to the joint intensity distribution substantially matching a learned joint intensity distribution of the trained data and a similarity measure between the two or more images satisfying a cost function, wherein the joint intensity distribution and the similarity measure are determined simultaneously during the alignment of the two or more images, and wherein the aligning of the two or more images comprises regularization of the displacement field between the two or more images and the trained data, wherein the method for non-rigid multi-modal registration is given by:

$\mathcal{J}(u)=\alpha \mathcal{I}_{MI}(u)+(1-\alpha) \mathcal{I}_{KL}(u)+\lambda \mathcal{R}(u)$, $\alpha \in [0,1]$, $\lambda \in \mathbb{R}_+ \hat{u}=argmin \mathcal{J}(u)$, where u is the displacement field, $\mathcal{R}$ defines regularization on u, and $\lambda$ is a positive constant that determines an amount of regularization, $\mathcal{I}_{KL}$ measures a divergence between the joint intensity distribution of the two or more images and the learned joint intensity distribution of the trained data, and $\mathcal{I}_{MI}$ denotes a mutual information of the joint intensity distribution of the two or more images.

2. The computer-implemented method of claim 1, wherein the regularization uses a Tikhonov regularization with the following gradient:

$$\nabla_u R[u] = div\left(\frac{R'[u]}{|\nabla u|}\nabla u\right) = div(\nabla u) = \Delta u,$$

3. The computer-implemented method of claim 1, wherein the desirable a similarity measure between two or more images and the trained data is a maximum.

4. A non-transitory computer readable medium embodying instructions executable by a processor to perform method steps for non-rigid multi-modal registration, the method steps comprising:

providing trained data corresponding to previously registered images captured by different modalities;

receiving two or more images captured by the different modalities; and performing a non-rigid multi-modal registration of the two or more images, the non-rigid multi-modal registration comprises registering the two or more images according to context information determined based on the trained data, wherein a correspondence between the two or more images is determined using a context information of shapes in the different modalities of the trained data corresponding to at least one pre-registered dataset among a plurality of pre-registered datasets, wherein a joint intensity distribution of the two or more images is adjusted to match a learned joint probability function, wherein the adjustment of the joint intensity distribution of the two or more images comprises regularization of a displacement field between the two or more images and the trained data, wherein the method for non-rigid multi-modal registration is given by:

$\mathcal{J}(u)=\alpha \mathcal{I}_{MI}(u)+(1-\alpha) \mathcal{I}_{KL}(u)+\lambda \mathcal{R}(u)$, $\alpha \in [0,1]$, $\lambda \in \mathbb{R}_+ \hat{u}=argmin \mathcal{J}(u)$, where u is the displacement field, $\mathcal{R}$ defines regularization on u, and $\lambda$ is a positive constant that determines an amount of regularization, $\mathcal{I}_{KL}$ measures a divergence between the joint intensity distribution of the two or more images and the learned joint probability function of the trained data, and $\mathcal{I}_{MI}$ denotes a mutual information of the joint intensity distribution of the two or more images.

5. The method of claim 4, wherein registering the two or more images is automatic.

6. The method of claim 4, wherein the trained data is a joint probability function of the different modalities.

7. The method of claim 6, wherein a learned joint probability function is used as a constraint or a regularizing factor in an optimization process of the registration.

8. The method of claim 4, wherein the trained data is an average image location of an image intensity pair.

9. The method of claim 4, wherein the trained data is shape information, the method comprising:

determining one or more shapes in the two or more images; and classifying the one or more shapes as valid or invalid according to the trained data.

10. The computer-implemented method of claim 1, wherein the displacement field is non-rigid.

11. A computer system for determining a non-rigid multi-modal registration of two or more images, comprising:

a memory device storing a plurality of instructions embodying a method for non-rigid multi-modal registration of two or more images;

a processor for receiving the two or more images and executing the plurality of instructions to perform the method comprising:

providing trained data corresponding to a prior registration;

providing two or more images captured using different modalities;

performing a non-rigid multi-modal registration of the two or more images, the non-rigid multi-modal registration comprising:

determining a displacement field of the two or more images, wherein a first image of the two or more images is defined as a reference image and a subsequent image is defined as alignment image comprising,
   estimating a marginal distribution of the reference image and the alignment image, and
   estimating a joint intensity distribution between the reference image and the alignment image; and
aligning the two or more images by adjusting the joint intensity distribution until an alignment of the two or more images corresponds to
   the joint intensity distribution substantially matching a learned joint intensity distribution of the trained data and
   a similarity measure between the two or more images satisfying a cost function,
   wherein the joint intensity distribution and the similarity measure are determined simultaneously during the alignment of the two or more images, and
   wherein the aligning of the two or more images comprises regularization of the displacement field between the two or more images and the trained data,
wherein the method for non-rigid multi-modal registration is given by:

$$\mathcal{J}(u) = \alpha \mathcal{I}_{MI}(u) + (1-\alpha) \mathcal{I}_{KL}(u) + \lambda \mathcal{R}(u), \alpha \in [0,1],$$
$$\lambda \in \mathbb{R}_+, \hat{u} = \arg\min \mathcal{J}(u),$$

where u is the displacement field, $\mathcal{R}$ defines regularization on u, and $\lambda$ is a positive constant that determines an amount of regularization, $\mathcal{I}_{KL}$ measures a divergence between the joint intensity distribution of the two or more images and the learned joint intensity distribution of the trained data, and $\mathcal{I}_{MI}$ denotes a mutual information of the joint intensity distribution of the two or more images.

* * * * *